(12) United States Patent
Douglas et al.

(10) Patent No.: US 9,325,644 B2
(45) Date of Patent: Apr. 26, 2016

(54) SYSTEMS AND METHODS FOR MANAGING INTERACTIVE COMMUNICATIONS

(75) Inventors: Angela Douglas, Brockton, MA (US); Danny Gao, Quincy, MA (US); Marie Knight, Woodstock, GA (US); Pucci Lee, Holly Springs, NC (US); Karen Reilly, Norfolk, MA (US); Gary Sedler, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 13/109,534

(22) Filed: May 17, 2011

(65) Prior Publication Data

US 2012/0297321 A1  Nov. 22, 2012

(51) Int. Cl.
*H04L 12/58* (2006.01)

(52) U.S. Cl.
CPC ........ *H04L 51/043* (2013.01); *G06F 2209/547* (2013.01)

(58) Field of Classification Search
CPC . G06F 2209/547; G06Q 50/01; H04L 51/043
USPC ....................................................... 715/758
See application file for complete search history.

(56) References Cited

U.S. PATENT DOCUMENTS

| 7,661,067 | B2 | 2/2010 | Chen et al. | |
|---|---|---|---|---|
| 7,752,278 | B2 | 7/2010 | Hui et al. | |
| 2005/0055412 | A1* | 3/2005 | Kaminsky | H04L 12/581 709/207 |
| 2006/0242232 | A1 | 10/2006 | Murillo et al. | |
| 2007/0061405 | A1* | 3/2007 | Keohane | G06Q 10/109 709/207 |
| 2007/0192734 | A1 | 8/2007 | Berstis et al. | |
| 2008/0071868 | A1* | 3/2008 | Arenburg et al. | 709/206 |
| 2008/0162633 | A1* | 7/2008 | Scherpa | H04L 12/1818 709/204 |
| 2009/0016512 | A1* | 1/2009 | Bryant et al. | 379/202.01 |
| 2009/0113342 | A1* | 4/2009 | Bank | H04L 12/5815 715/808 |
| 2009/0245500 | A1* | 10/2009 | Wampler | H04M 3/42382 379/265.09 |

* cited by examiner

*Primary Examiner* — Sherrod Keaton (74) *Attorney, Agent, or Firm* — Schmeiser, Olsen & Watts LLP (57) ABSTRACT

Described are systems and methods for managing a display of chat windows. A user electronic device receives an incoming communication from a remote electronic device. A chat session is established between the user electronic device and the remote electronic device in response to receiving the incoming communication. A period of time is input to the user electronic device during which a display of all incoming communications are prevented from being displayed in chat windows in the user electronic device. At least one of a display of new chat windows and the chat session is suspended during the period of time. An electronic notification is generated that indicates that a user of the user electronic device is temporarily unavailable.

15 Claims, 5 Drawing Sheets

SYSTEMS AND METHODS FOR MANAGING INTERACTIVE COMMUNICATIONS

FIELD OF THE INVENTION

The present invention relates generally to interactive communications between computer users, and more specifically, to systems and methods for managing the receipt and presentation of incoming chat requests to a computer display screen.

BACKGROUND

Computer users can communicate with each other in a variety of different ways. Popular forms of online communication between users include instant messaging (IM), instant messaging and presence (IM&P), online chat rooms, voice-over-IP (VoIP), video conferencing, and the like.

A user can participate in an online chat session with another user by executing an interactive communications application, for example, an IM&P application, on a personal computer, a smartphone, or other electronic device with a display. The IM&P application typically presents a main application window on the computer display screen. A contact list, also referred to as a "buddy list," is displayed in the main application window. The contact list can include a list of names, nicknames, or other identifiers corresponding to friends, family, professional acquaintances, or other contacts. When the user selects a contact from the contact list, the user is presented with a window, prompt, box, or other form of presentation from which the user can enter text messages and the like into the IM&P application for transmission to the selected contact. A chat window, also referred to as a pop-up window, can be opened on the selected contact's computer to display the received message on the display screen.

Due to the popularity of instant messaging, internet chat rooms, and related forms of online communication, it is not uncommon for a computer user, for example, a selected contact, to receive several concurrent text messages. Several chat windows can be opened on the selected contact's computer for displaying the text messages.

BRIEF SUMMARY

In one aspect, a method is provided for managing a display of chat windows. A user electronic device receives an incoming communication from a remote electronic device. A chat session is established between the user electronic device and the remote electronic device in response to receiving the incoming communication. A period of time is input to the user electronic device during which a display of all incoming communications are prevented from being displayed in chat windows in the user electronic device. At least one of a display of new chat windows and the current chat session is suspended during the period of time. An electronic notification is generated that indicates that a user of the user electronic device is temporarily unavailable.

In another aspect, a chat window notification system comprises a chat request detection module, a delay interval module, a chat window controller, and a notification module. The chat request detection module detects at least one incoming communication from a remote electronic device. The delay interval module generates a delay signal according to a user-defined period of time during which a display of all incoming communications are prevented from being displayed in chat windows in a user electronic device. The chat window controller suspends at least one of a display of new chat windows and existing chat sessions during the period of time in response to the delay signal. The notification module generates an electronic notification that indicates that a user of the user electronic device is temporarily unavailable.

In another aspect, a computer program product is provided for managing a display of pop-up windows. The computer program product comprises computer readable storage medium having computer readable program code embodied therewith. The computer readable program code comprises computer readable program code configured to receive an incoming communication from a remote electronic device. The computer readable program code further comprises computer readable program code configured to input a period of time to a user electronic device during which a display of all incoming communications are prevented from being displayed in chat windows in the user electronic device. The computer readable program code further comprises computer readable program code configured to suspend at least one of a display of new chat windows and the chat session during the period of time. The computer readable program code comprises computer readable program code configured to generate an electronic notification that indicates that a user of the user electronic device is temporarily unavailable.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In the following description, specific details are set forth although it should be appreciated by one of ordinary skill that the systems and methods can be practiced without at least some of the details. In some instances, known features or processes are not described in detail so as not to obscure the present invention.

A user can activate an IM&P application and the like on a personal computer, smartphone, or other electronic device to communicate with more than one other IM&P user concurrently. However, it can be difficult for a user to participate in an online conversation such as a chat session with multiple IM&P users at the same time, or to work on a different application on the computer while also engaged in a chat session. This is particularly true when the computer is configured to display a chat window each time a message is received, whereby many chat windows can appear on the user's computer display causing frequent interruptions for the user.

A typical approach is for a user to participate in one online chat session at a time and to ignore incoming chat requests from other IM&P users while engaged in a given chat session. In doing so, the user may minimize any new chat windows that appear on the user's computer display.

Another approach taken by a user is to engage in multiple online chat sessions. However, an IM&P user can only send messages to one other IM&P user at a time. Thus, when the IM&P user is engaged in one chat session, for example, exchanging text messages with one other IM&P user, other chat requesters must wait for the user to complete an action corresponding to the current chat session before the user can turn his or her attention to the other chat requesters. For example, reference is made to FIG. 1, which shows a block diagram depicting a network environment 10 for interactive communications, in accordance with an embodiment. When a user at a remote electronic device 16-N sends a chat message to a user at a user electronic device 20, the user at the remote electronic device 16-N may wait indefinitely for a response from the user if the user electronic device 20 is engaged in a current chat session with a different user, i.e., the user at the remote electronic device 16-1, or if the user 20 is preoccupied with other computer activities, e.g., typing a letter, playing online games, etc. Any new users who attempt to establish a chat session with the user electronic device 20 can receive a message that the user 20 is unavailable for a period of time, for example, 15 minutes.

The present inventive concepts relate to systems and methods for managing multiple chat windows on a display in situations where a user receives an excessive number of chat windows. The systems and methods include a control mechanism such as a pause button located on the user interface of an interactive communications application, for example, an IM&P application. When the pause button is selected, a new window, web page, box, and the like will pop up or otherwise be displayed for the user to enter information such as a time interval during which all new incoming chat requests and/or all currently opened chat windows are to be suspended. In addition or alternatively, another field can be provided where the user can enter information such as a maximum number of chat windows that can be opened. For example, if five chat sessions are currently active, and five windows corresponding to the active chat sessions are opened, a field set to five (5) will prevent additional popup chat windows from opening on the display. After the predefined time interval expires, the field that is provided for the number of chat windows can also be reset so that the user can receive more chat windows. Also, any original messages sent but suspended will automatically pop up in a window after the period of time expires. Accordingly, new chat windows can be prevented from being displayed or messages can be prevented from appearing in a currently-displayed chat window.

During the period during which chat sessions are suspended, the other chat participants who are parties to the suspended chat sessions can receive a notification, for example, a message indicating that the user is temporarily unavailable. In embodiments where the user is included in another chat participant's contact list, a status indicator corresponding to the user identifier in the contact list can be changed to indicate that the user is temporarily unavailable. After the user-defined period of time has expired, the user's status reverts to its original status, for example, the status indicator indicates that the user is available for online communication.

These features of the present inventive concepts can be provided regardless of the configuration of the user's IM&P application, for example, when the user's IM&P application is configured to permit new chat windows to pop-up in front of other displayed chat windows.

Accordingly, a feature of the present inventive concepts provides an IM&P user with additional broadcast capabilities applied to a group of individuals having a relationship with the IM&P user, for example, acquaintances identified in an IM contact list. These individuals can receive a message at any time, based on their current active state as identified by the user's IM&P application. The user can generate one or more notification messages through an IM&P application based on an active chat window presence, for example, selecting only those remote IM&P users identified by the user's IM&P application as having a current chat session with the user.

Figure 1:
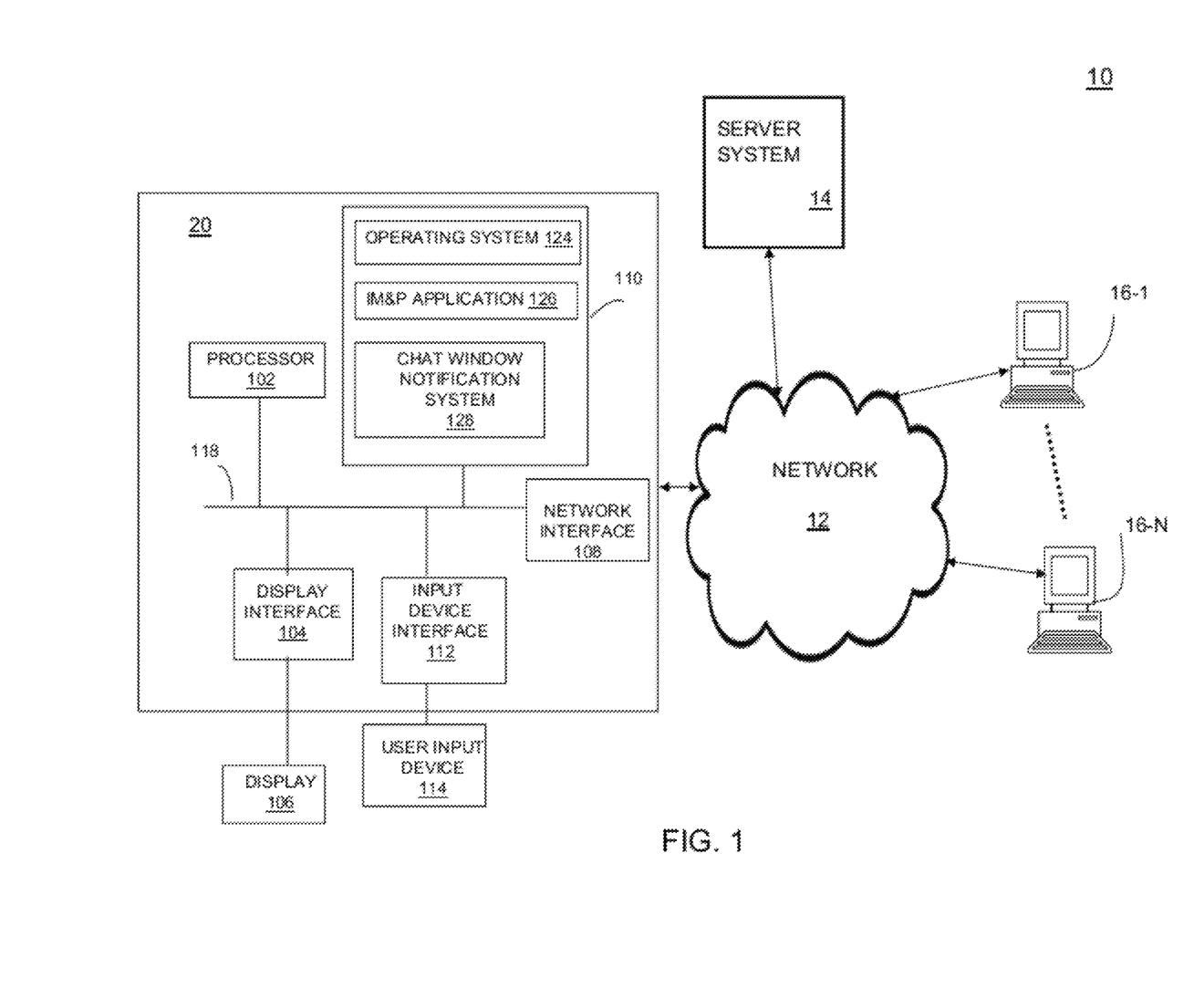
FIG. 1 is a block diagram depicting a network environment for interactive communications, in accordance with an embodiment.

The network environment 10 shown in FIG. 1 includes a user electronic device 20, a plurality of remote electronic devices 16-1 through 16-N (generally, 16), and an optional server system 14, for example, an IM server, that communicate with each other and can exchange content, applications, messages, and the like via a network 12. Examples of the network 12 include, but are not limited to, local-area networks (LAN), wide-area networks (WAN), such as the Internet, or other any combination of wireless and wired networks known to those of ordinary skill in the art for transmitting voice, data, video, and/or other media types used in online communications.

The user electronic device 20 and the remote electronic devices 16 can each be connected to the network 12 through one of a variety of connections known to those of ordinary skill in the art, such as a standard telephone line, digital subscriber line (DSL), cable, LAN, WAN, broadband, Wi-Fi, or other wireless and wired connections known to those of ordinary skill in the art. Example implementations of the user electronic device 20 and the remote electronic devices 16 can include, but are not limited to personal computers, laptop computers, workstations, kiosks, handheld electronic devices, tablet computers, smartphones, personal digital assistants (PDA) or other handheld computer, or other electronic devices in communication with a display and an input device such as a keyboard, and configured to receive and/or output voice, data, video, and/or other media types.

The user electronic device 20 and the remote electronic devices 16 can each register with the server system 14, for example, by entering a username and a password. When a user activates an IM&P application 126 of the user electronic device 20, the server system 14 is notified that the user electronic device 20 is available for communicating with other IM&P users. The remote electronic devices 16 each receive status information regarding the activation of the IM&P application of the user electronic device 20 if the user of the user electronic device 20 is identified in the contact lists of the remote electronic devices 16. For example, when the IM&P application 126 of the user electronic device 20 is activated and validated with the server system 14, the user electronic device 20 is identified as being active, and the contact lists of the remote electronic devices 16 are updated to indicate that the user electronic device 20 is "available" for communication with other users running a compatible IM&P application.

The user electronic device 20 includes a processor 102, a display interface 104, a network interface 108, a memory device 110, and an input device interface 112 that can communicate with each other over a communications bus 118, for example, a Peripheral Component Interconnect (PCI) bus. Although shown as a single bus, the communications bus 118 can comprise multiple separate busses, which may be of different types. The communications bus 118 can connect the processor 102 to other components of the user electronic device 20 not shown for purposes of brevity, for example, user-input devices such as a keyboard, mouse, displays, peripherals, additional memory, for example, read-only memory (ROM), random access memory (RAM), and the like. The network interface 108 can include one or more connectors known to those of ordinary skill in the art, depending on the network type, e.g., LAN, WAN, wireless, and the like, permitting the user electronic device 20 to establish bi-directional voice, video and/or data communications with the remote electronic devices 16, the server system 14, or other electronic devices, e.g., computers, mobile devices, servers, and the like, via the network 12.

The processor 102 processes data under the control of an operating system 124, for example, Microsoft Windows®, Linux®, and the like, which is loaded into the memory device 110. The memory device 110 also stores program code corresponding to the IM&P application 126 and a chat window notification system 128, required for the management of multiple chat windows on the display 106 in accordance with embodiments described herein. The memory device 110 includes at least one of non-volatile computer storage media, such as read-only memory (ROM) and volatile computer storage media, such as random-access memory (RAM). Stored in the ROM may be a basic input/output system (BIOS), which contains program code for controlling basic operations of the user electronic device 20, including start-up of the electronic device and initialization of hardware. Stored within the RAM can include program code and data described herein, such as program code corresponding to the IM&P application 126, the chat window notification system 128, program modules, plug-ins, and/or the operating system 124.

The IM&P application 126 can be either a proprietary application or a commercially available application, for example, the IBM Lotus® Sametime® unified communications and collaboration application suite. Although FIG. 1 refers to an IM&P application 126, other application programs can be applied that permit a user to establish an online chat session or other interactive communication with other use, for example, applications related to instant messaging and presence (IM&P), email, voice over IP, video conferencing, mobile messaging, internet browsing, electronic document processing, file transfer, and the like.

The IM&P application 126 includes a user interface that presents a main messaging window on the display 106 of the user electronic device 20. The chat window notification system 128 and the IM&P application 126 can share the same user interface, or include different user interfaces. The user interface of the IM&P application 126 can be used to set parameters in the chat window notification system 128 such as a maximum number of open windows, a time period during which chat sessions are suspended, or other related parameters. The main messaging window can include a contact list, for example, shown in FIG. 7. A user can select a contact from the contact list, whereby a new window or region is presented for the user to exchange text messages, file transfer information, or other data with the selected contact. The contact list can be stored locally on the user electronic device 20, or stored on the server system 14 and transmitted to the user electronic device 20 for display from the IM&P application 126 when the IM&P application 126 is activated and in communication with the server system 14.

The IM&P application 126 can generate a chat window when an incoming chat message is sent from a contact in the contact list to the user electronic device 20. The IM&P application 126 can be configured to display multiple chat windows, each corresponding to an incoming chat message, in a manner readily known to those of ordinary skill in the art. For example, chat windows can be shown on the display 106 in a cascade arrangement, and in accordance with a chronological order, where the most recent chat window is prominently displayed on the computer, thereby blocking or at least partially obscuring other displayed windows in the cascade arrangement.

The input device interface 112 permits a user to enter input to the IM&P application 126 from a user input device 114, for example, via a keyboard, a mouse, trackball, touch-pad, touch-screen, microphone, joystick, and the like. The display interface 104 permits the user to receive text, video, and the like, which is output to a display 106, for example, a computer monitor or a smartphone touchscreen.

The chat window notification system 128 can be part of an application such as the IM&P application 126, or other application that processes and generates popup windows. Alternatively, the chat window notification system 128 can be separate from, and in communication with, other applications such as the IM&P application 126. The chat window notification system 128 controls the display of pop-up boxes on the display 106 based on user availability or other requirements. In particular, the chat window notification system 128 can temporarily suspend the presentation of a chat window on the display 106, or change the size or position of a chat window, in accordance with user requirements as described herein. In addition, the chat window notification system 128 can generate notifications to the chat session originators or requesters, informing them that the recipient is unavailable. The chat session originators can be notified by a text message, voice recording, or related communication. The chat window notification system 128 can generate a signal that changes a status indicator corresponding to the user on the requesters' contact lists, for example, an icon indicating that the user is unavailable, for example, shown in FIG. 7.

Figure 2:
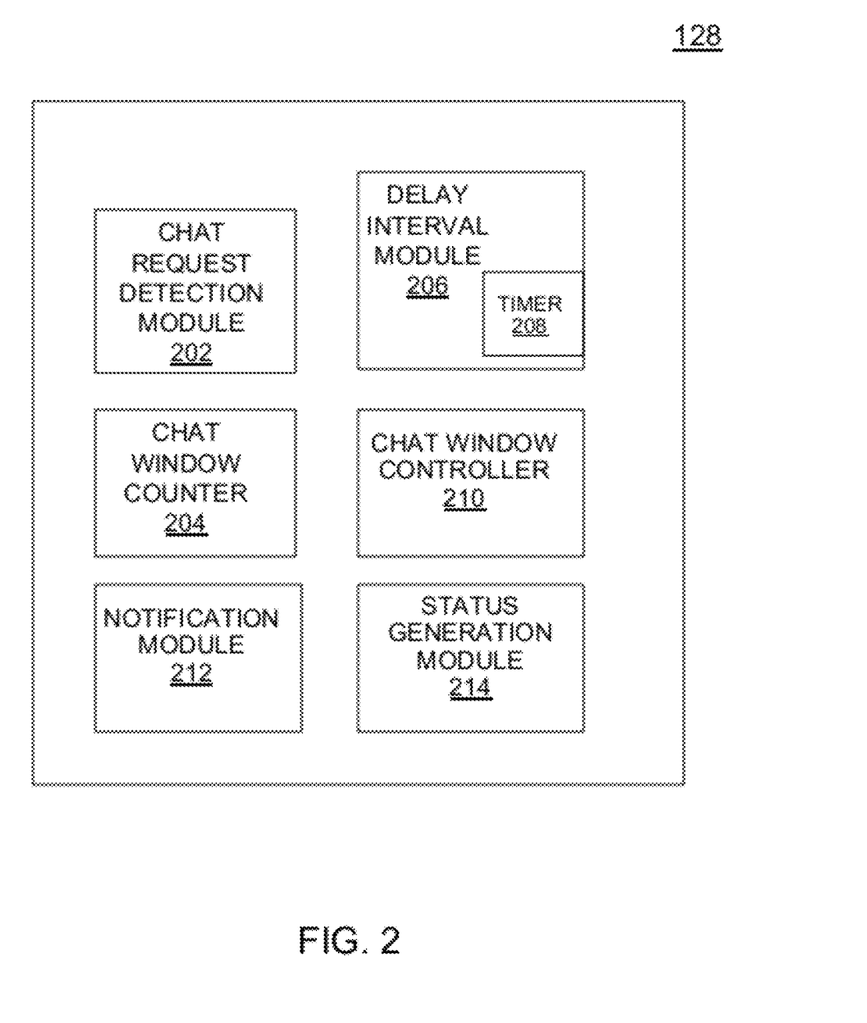
FIG. 2 is a block diagram of a chat window controller shown in FIG. 1, in accordance with an embodiment.

FIG. 2 is a block diagram of an embodiment of the chat window notification system 128 shown in FIG. 1. The chat window notification system 128 includes a chat request detection module 202, a chat window counter 204, a delay interval module 206, a chat window controller 210, a notification module 212, and a status generation module 214. The chat window notification system 128 can execute entirely on the user electronic device 20. Elements of the chat window notification system 128 can be installed in different memory devices and/or executed by different processors, and can communicate with each other via the communications bus 118 and/or other connectors known to those of ordinary skill in the art.

The chat request detection module 202 detects one or more incoming chat messages, for example, an IM text message, sent from a user of a remote electronic device 16 to the IM&P application 126 executed on the user electronic device 20. The incoming chat message can be presented in a new chat window generated for in response to the received chat message. The generated chat window can be prominently displayed at the front of the display 106, for example, in front of other opened chat windows, or other applications executed on the user electronic device 20 and displayed on the display 106. Alternatively, the incoming chat message can be presented in a currently displayed chat window, obviating the need to open a different chat window.

The chat window counter 204 counts a number of currently displayed chat windows and stores the result in memory. The chat window controller 210 can compare the number of currently displayed chat windows with a threshold number of open chat windows determined by the user, and prevent any new chat windows from being displayed that exceed the threshold number. Alternatively, the user can make a mental determination as to when there are a sufficient number of concurrently open windows, without the need to enter a threshold number to the chat window notification system 128. For example, during use of the user electronic device 20, the user can determine by viewing the display 106 whether five open chat windows are a maximum number for display. If so, the user can prevent additional chat windows from being opened after the fifth chat window is opened in accordance with embodiment described herein. In doing so, the user can activate a control mechanism such as a pause button located on a tool bar of the user interface of the IM&P application 126. When selected, a window, web page, box, and the like is displayed for the user to enter criteria, for example, a period of time, under which all new incoming chat requests and/or all active chat sessions are to be suspended.

The delay interval module 206 generates a delay signal according to the entered criteria, e.g., a user-defined period of time. The criteria can be submitted to the delay interval module 206 via a window, web page, box, and the like, displayed from the chat window notification system 128, or from the IM&P application 126. The delay interval module 206 includes a timer 208 that tracks the user-defined period of time. For example, a user can submit a number of minutes or other unit of time for suspending all active chats and/or incoming chat messages. The timer 208 determines an amount of time remaining, for example, the number of minutes, before the user-defined period of time expires. The delay interval module 206 generates the delay signal periodically to the chat window controller 210. Each periodic generation of the delay signal includes the amount of time remaining in the user-defined period of time, which can be provided in a notification described herein.

The chat window controller 210 processes the received delay signal, and prevents chat windows from opening according to the period of time provided in the delay signal, or prevents messages from being displayed in existing chat windows. After the predetermined period of time delay has elapsed, the chat window controller 210 permits the generation of new chat windows and/or the resumption of existing chat sessions.

The notification module 212 generates a notification message that informs users of the remote electronic devices 16 engaged in chat sessions with the user of the user electronic device 20 that the user is unavailable. The notification module 212 can also generate a notification message for chat requesters, i.e., those users who send a request to initiate a chat session with the user electronic device 20, but are prevented from doing so during the user-defined period of time by the chat window controller 210.

The status generation module 214 outputs a status change signal to the IM&P application 126 for changing the status indicator corresponding to the user of the user electronic device 20 identified in a contact list displayed by the IM&P application 126. The status generation module 214 can output a status change signal to the IM&P application 126 for changing the status indicator to provide a different user status, for example, referring to the user as being unavailable when the chat window controller 210 receives the delay signal. When the user-defined period of time expires, the status generation module 214 can output a status change signal to the IM&P application 126 for changing the status indicator to refer to the user as being unavailable.

Figure 3:
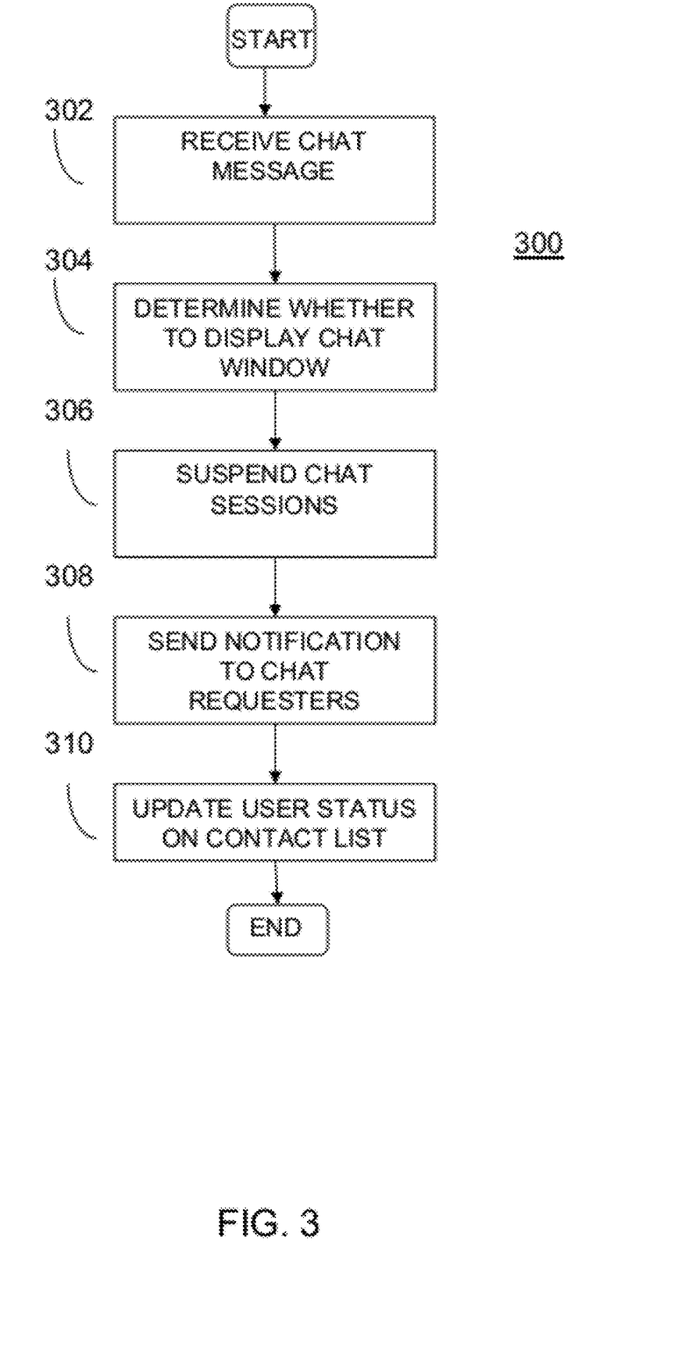
FIG. 3 is a flowchart of a method for managing a presentation of chat windows, in accordance with an embodiment.

FIG. 3 is a flowchart of an embodiment of a method 300 for managing a presentation of chat windows. Some or all of the method 300 can be performed in the user electronic device 20 described with reference to FIGS. 1 and 2. Some or all of the method 300 can be performed in an interactive communications application, for example, the IM&P application 126. In describing the method 300, reference is also made to FIGS. 1 and 2.

The method 300 begins with the user electronic device 20 receiving a chat message (302), for example, sent from a remote electronic device 16. The chat message can include a request to open a chat window for displaying the chat message. Multiple chat messages can be received concurrently, or within a short period of time from each other. A chat window can be opened for each chat message on a display 106 of the user electronic device 20. The IM&P application 126 can be configured to arrange multiple chat windows in a manner known to those of ordinary skill in the art, for example, presented in a cascade stack and organized such that the most recently generated chat window is displayed at the top of the cascade stack.

The user can determine whether to display one or more chat windows (304), or whether to temporarily prevent the display of chat windows. The user can make a mental determination as to when there are a sufficient number of concurrently open windows, for example, no more than five open windows, and activate a pause button or other control mechanism on a user interface when five chat windows are displayed so that no additional chat windows are opened. Alternatively, the user can enter a threshold number of chat windows to the chat window notification system 128, which compares the threshold number to a number of currently displayed chat windows, and prevents additional chat windows from being opened when the threshold number is reached.

The user can submit a request to suspend new chat windows (306) from opening for a predetermined period of time. For example, the user can select a pause button provided on the user interface of the IM&P application 126. In response to selecting the pause button, a window, web page, and the like can be displayed for the user to enter a time period during which chat sessions with the user are suspended.

A notification can be generated (308) for informing chat requesters and/or current chat session participants of the temporary unavailability of the user. In an embodiment, a notification is transmitted to a chat requester who attempts to send a chat message, which is blocked from being presented to the user. In another embodiment, a notification is broadcast to current chat session participants, informing the participants that the user is temporarily unavailable, or providing the participants with other related information.

The user's status on a chat requester's contact list can also be updated (310) to refer to the user as being unavailable. For example, the user's status indicator next to the user's name or identifier in an IM contact list can refer to the user as being unavailable.

Figure 4:
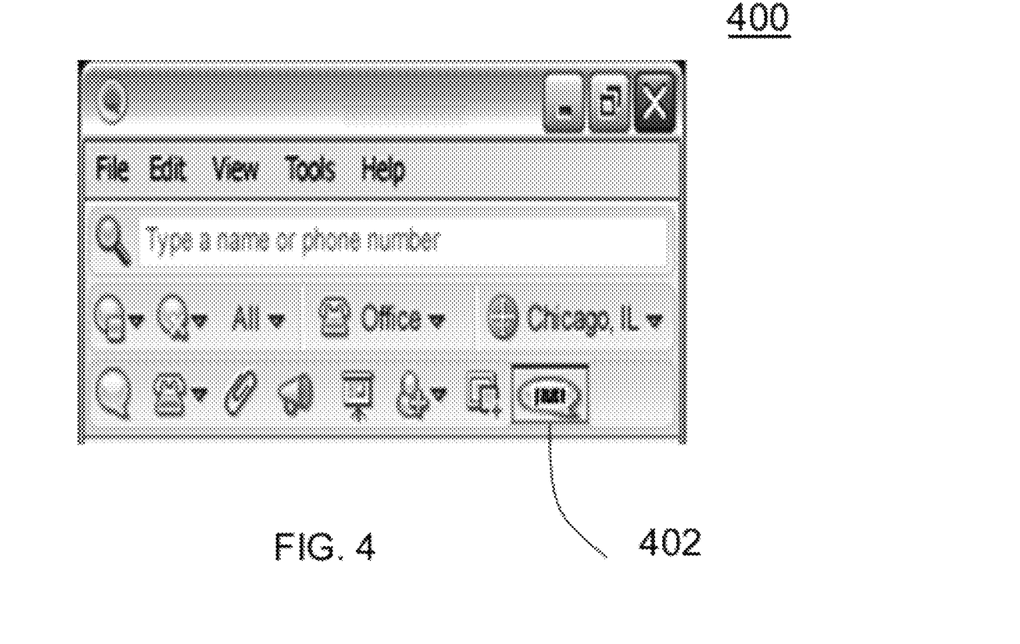
FIG. 4 is a screenshot illustrating an example of an instant messaging user interface, in accordance with an embodiment.

FIG. 4 is a screenshot illustrating an example of an embodiment of a user interface 400. The user interface 400 can be part the IM&P application 126 described in FIGS. 1-3. The user interface 400 can communicate with the chat window notification system 128 described in FIGS. 1-3, for example, receiving signals generated by a pause button 402 when selected. The pause button 402 can be displayed from the user interface 400, for example, from a toolbar.

As shown in FIG. 4, a user interface 400 of the IM&P application 126 can include a pause button 402 or other control mechanism for controlling the display of chat windows.

Figure 5:
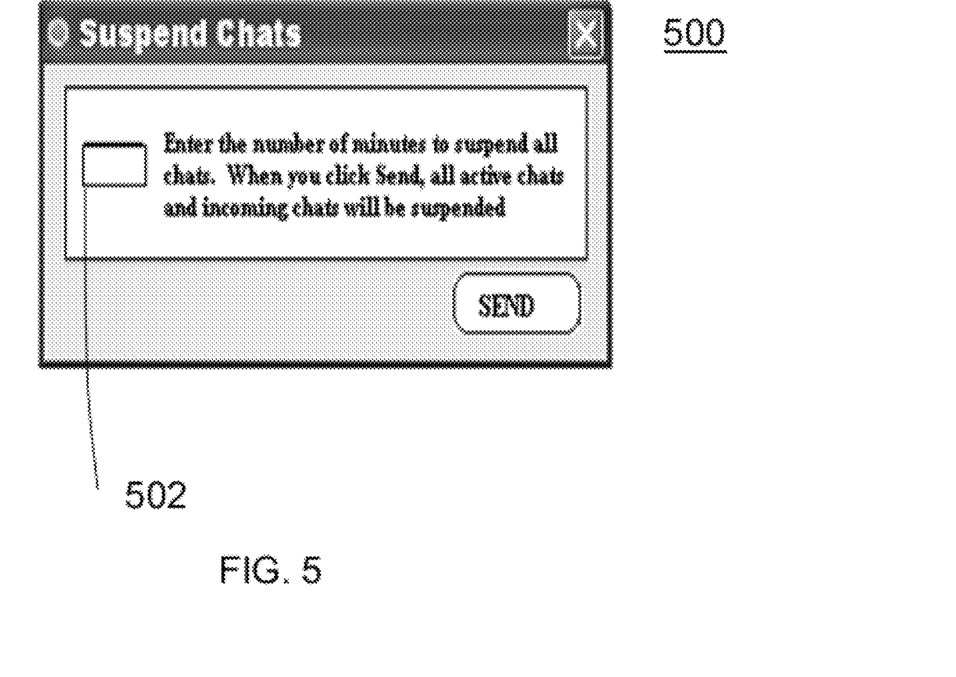
FIG. 5 is a screenshot illustrating an example of a window displayed on a computer screen for entering a period of time to suspend chat sessions, in accordance with an embodiment.
Figures 6, 7:
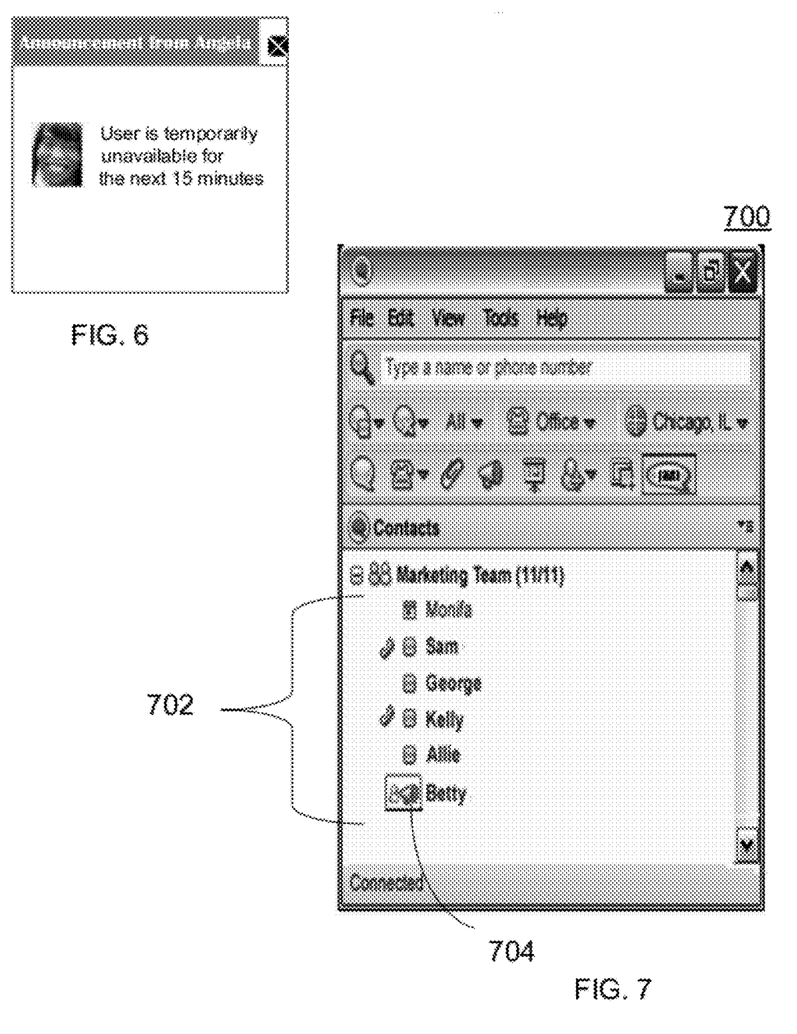
FIG. 6 is a screenshot illustrating an example of a notification presented to a chat session participant, in accordance with an embodiment.
FIG. 7 is a screenshot illustrating an example of an instant messaging contact list, in accordance with an embodiment.

FIG. 5 is a screenshot illustrating an example of an embodiment of a window 500 displayed on a computer screen for entering a period of time to suspend chat sessions. The window 500 can be displayed in response to selecting the pause button 402 shown in FIG. 4. The window 500 can be displayed from an interactive communications application, such as the IM&P application 126 described herein. When displayed, the user can enter criteria for controlling the display of chat windows, for example, criteria such as a maximum number of chat windows or a period of time during which new chat windows are blocked from display FIG. 6 is a screenshot illustrating an example of an embodiment of a notification 600 presented to a chat session participant. For example, the notification 600 is sent as an alert to a remote electronic device 16 in an interactive communication, e.g., a chat session, with the user electronic device 20 shown in FIG. 1. The notification 600 can include a message indicating a time interval during which the user 20 is unavailable, in this example, 15 minutes. The notification 600 can include other information that is useful to the user of the remote electronic device 16 in determining whether to send a chat message to the user 20.

FIG. 7 is a screenshot of an embodiment of an instant messaging user interface 700 displayed to a chat session participant showing a contact list indicating the user as being unavailable after pressing the pause button. When the IM&P application 126 is executed on the remote electronic device 16, a contact list 702 is presented on the display of the remote electronic device 16. The contact list 702 can be presented in a manner readily known to those of ordinary skill in the art, for example, presented in chronological order, i.e., when the contact was created. The contact information can be retrieved from a well-known sources, for example, server system 14 described in FIG. 1, an LDAP server, and the like. A status of each contact can be displayed, for example, by an icon or other status indicator provided by the user interface 700. For example, Betty can be a user of chat window notification system 128 described herein. When Betty requests a temporary suspension of chat sessions on her computer screen, a status indicator 704 corresponding to Betty is displayed on the chat session participant's user interface 700, indicating that Betty is unavailable for receiving chat messages.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A computer-implemented method for managing a display of chat windows, comprising:
    establishing an active chat session between a user electronic device and each of a plurality of remote electronic devices;
    receiving a request for a new chat session from another remote electronic device;
    in response to user selection of a pause button, inputting, at a pop-up window region of a user interface of the user electronic device that is independent of the plurality of active chat sessions, a maximum number of chat windows that can be displayed and a period of time to the user electronic device during which all incoming chat communications from the plurality of remote electronic devices are prevented from being displayed in chat windows in the user electronic device;
    preventing the user electronic device from displaying additional chat windows related to the active chat session during the period of time;
    preventing new chat windows from being displayed that exceed the maximum number of chat windows;
    simultaneously suspending, by generating a command at a region of a user interface of the user electronic device that is independent of the plurality of active chat sessions, a display of new chat windows corresponding to the incoming communications of the active chat sessions of the plurality of remote electronic devices and further preventing the new chat session from occurring during the period of time; and
    broadcasting, in response to generating the command at the user electronic device, an electronic notification and a presence indicator to the plurality of remote electronic devices involved in the active chat sessions that indicate that a user of the user electronic device is temporarily unavailable for receiving chat session communications, wherein the electronic notification is a message displayed at each remote electronic device, the message comprising the user electronic device is temporarily unavailable during the inputted period of time, and additional information useful to the remote electronic device in determining whether to send a chat message to the user, wherein the presence indicator includes displaying the user is unavailable on a contact list in response to the user selection of the pause button.

2. The computer-implemented method of claim 1, further comprising:
    selecting a control mechanism from an interactive communications application of the user electronic device; and
    inputting the period of time to an interactive display presented by the interactive communications application.

3. The computer-implemented method of claim 2, wherein the control mechanism is the pause button displayed in a toolbar of the interactive communications application.

4. The computer-implemented method of claim 1, wherein the message includes the period of time during which the user of the user electronic device is unavailable for engaging in an online interaction with the users of the remote electronic devices.

5. The computer-implemented method of claim 1, further comprising:
    selecting the user of the user electronic device from the contact list displayed from an interactive communications application on a remote electronic device of the plurality of remote devices; and
    transmitting the incoming communication to an interactive communications application on the user electronic device in communication with the interactive communications application on the remote electronic device.

6. The computer-implemented method of claim 5, wherein the interactive communications application on the user electronic device and the interactive communications application on the remote electronic device each include an instant messaging and presence (IM&P) application.

7. The computer-implemented method of claim 1, further comprising: after the period of time has elapsed, changing the presence indicator to identify the user as being available for receiving communications.

8. A chat window notification system of a user electronic device having wireless communications with remote electronic devices, comprising:
    A processor;
    A memory coupled to the processor encompassing:
    a chat request detection module that establishes an active chat session between the user electronic device and each of the remote electronic devices, and inputs a maximum number of chat windows that can be displayed;
    a control mechanism comprising a pause button configured as part of an IM&P application displayed to the user in a toolbar of an interactive communications application;
    a delay interval module that generates a delay signal by inputting via the pause button, wherein in response to user selection of the pause button, inputting at a pop-up window region of a user interface of the electronic device that is independent of active chat sessions, a maximum number of chat windows that can be displayed and a period of time during which all incoming chat communications from the remote electronic devices are prevented from being displayed in chat windows; a chat window controller that (1) prevents displaying additional chat windows related to the active chat session during the period and time, (2) prevents new chat windows from being displayed that exceed the maximum number of chat windows, and (3) simultaneously suspends, by generating a command at a region of the user interface that is independent of the active chat sessions, a display of new chat windows corresponding to the incoming communications of the active chat sessions of the remote electronic devices and further prevents a new chat session from occurring during the period of time; and a notification module that broadcasts, in response to the command at the user electronic device, an electronic notification and a presence indicator to the remote electronic devices involved in the active chat session indicating that a user of the user electronic device is temporarily unavailable for receiving chat session communications, wherein generating the electronic notification includes broadcasting a message to each remote electronic device, the message comprising a communication that the user electronic device is temporarily unavailable during the inputted period & time, and additional information useful to the remote electronic device in determining whether to send a chat message to the user, wherein the presence indicator includes displaying the user as unavailable on a contact list in response to the user selection of the pause button.

9. The chat window notification system of claim 8, wherein the notification module broadcasts the electronic notification to each remote electronic device engaged in the active chat session with the user of the user electronic device.

10. The chat window notification system of claim 8, wherein the notification module broadcasts a message to each remote electronic device that sends a chat message to the user electronic device which is prevented from being displayed in a chat window in the user electronic device during the period of time.

11. The chat window notification system of claim 8, wherein the chat window notification system is in communication with an interactive communications application on the user electronic device that transmits the electronic notification to an interactive communications application on the remote electronic devices.

12. The chat window notification system of claim 11, wherein the interactive communications application on the user electronic device and the interactive communications application on the remote electronic device each include an instant messaging and presence (IM&P) application.

13. The chat window notification system of claim 8 further comprising a status generation module that generates a status change signal provided to the remote electronic device for changing a status indicator corresponding to the display by the remote electronic device to indicate that the user is temporarily unavailable.

14. The chat window notification system of claim 8 further comprising a chat window counter that counts a number of currently displayed chat windows, wherein the chat window controller compares the number of currently displayed chat windows with the maximum number of chat windows and prevents any chat windows that exceed the maximum number from being displayed.

15. A computer program product for managing a display of pop-up windows, the computer program product comprising:

a non-transitory computer readable storage medium having computer readable program code embodied therewith, the computer readable program code comprising;

computer readable program code configured to establish an active chat session between a user electronic device of a user and one or more remote electronic devices;

computer readable program code configured to receive a request for a new chat session from a remote electronic device;

computer readable program code configured to input, in response to user selection of a pause button, at a pop-up window region of a user interface of the user electronic device that is independent of the plurality of active chat sessions, (1) a period of time to the user electronic device during which a display of all incoming communications of active chat sessions are prevented from being displayed in chat windows in the user electronic device, and (2) a maximum number of chat windows that can be displayed;

computer readable program code configured to prevent the user electronic device from displaying additional chat windows related to the active chat session during the period of time and to prevent new chat windows from being displayed that exceed the maximum number of chat windows;

computer readable program code configured to simultaneously suspend, by generating a command at a region of a user interface of the user electronic device that is independent of the plurality of active chat sessions, a display of new chat windows corresponding to the incoming communications of the active chat sessions of the plurality of remote electronic devices and further prevent the new chat session from occurring during the period of time; and computer readable program code configured to broadcast, in response to generating the command at the user electronic device, an electronic notification and a presence indicator to the remote electronic devices involved in the active chat sessions indicating that the user electronic device is temporarily unavailable for receiving chat session communications, wherein generating the electronic notification includes broadcasting a message to each remote electronic device that the user electronic device is temporarily unavailable during the period of time with additional information useful to the remote electronic device in determining whether to send a chat message to the user, wherein the presence indicator includes displaying that the user is unavailable on a contact list, in response to the user selection of the pause button.

* * * * *